Oct. 6, 1959             L. D. LEE             2,907,461

APPARATUS FOR SEPARATING PARTICLES FROM LIQUID

Filed July 12, 1957             2 Sheets-Sheet 1

INVENTOR
LESTER D. LEE
BY
Reif & Gregory
ATTORNEYS

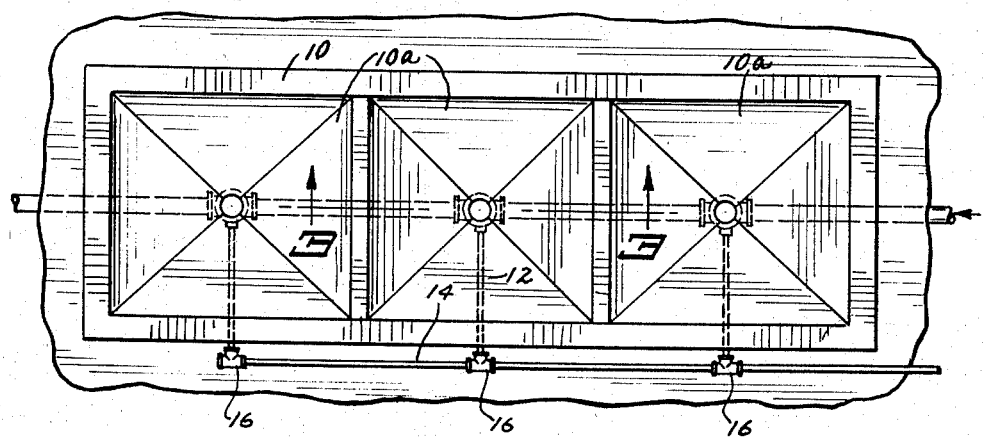
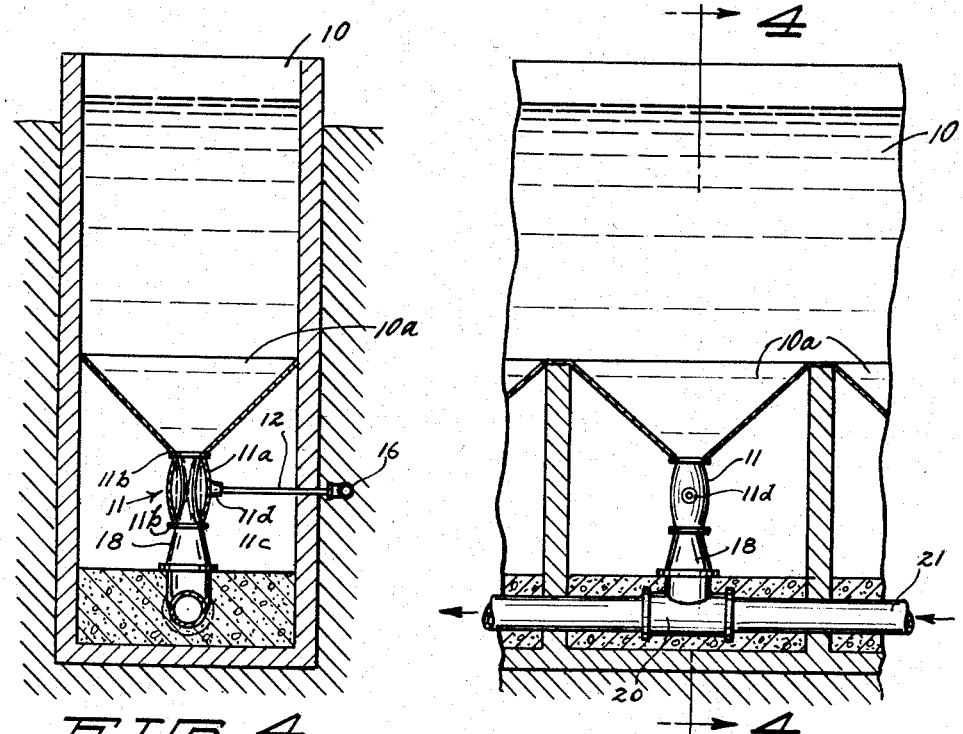

United States Patent Office 2,907,461
Patented Oct. 6, 1959

2,907,461

APPARATUS FOR SEPARATING PARTICLES FROM LIQUID

Lester D. Lee, Minneapolis, Minn.

Application July 12, 1957, Serial No. 671,496

1 Claim. (Cl. 210—138)

This invention relates to a device for removing a sediment, such as grit, sand or other fairly heavy granular material from a liquid. In many kinds of apparatus a liquid is handled which contains fairly heavy granular material, such as grit, sand, etc., and in which it is desirable to remove the said sediment as efficiently as possible. In quite a few cases the grit or sediment is removed manually.

It is an object of this invention to provide an apparatus in which a sediment, such as sand, grit, etc. can be removed from a liquid after the sediment has settled without manually handling the sediment and without disturbing the liquid.

It is a further object of the invention to provide an apparatus comprising a tank having one or more compartments in which liquid is contained, said liquid having grit, sand or other fairly heavy granular material therein, a receptacle at the bottom of each of said compartments for receiving said grit, sand or other granular material as it settles as sediment from said liquid, together with a valve between each of said compartments and said receptacles, a conduit connected to said receptacles for passing a fluid under pressure therethrough for removing sediment from said receptacles, and means for closing said valves whereby said sediment can be flushed from said receptacles without manually handling the same and without disturbing the liquid in said compartments.

It is another object of the invention to provide such an apparatus as set forth in the preceding paragraph, together with means controlled from a distance for mechanically closing said valves.

It is further an object of the invention to provide a device as set forth in the preceding object save one, in which the valves used are preferably of a type having a casing and a flexible tube extending therethrough with means for having a fluid under pressure supplied to said casing for collapsing said valves respectively to close the same.

It is still another object of the invention to provide a novel method of separating sand, grit or other fairly heavy granular material from liquid as a sediment without manually handling said sediment.

These and other objects and advantages of the invention will be fully set forth in the following description made in connection with the accompanying drawings in which like reference characters refer to similar parts throughout the several views and in which:

Fig. 2 is a plan view of said apparatus;

Figure 1:
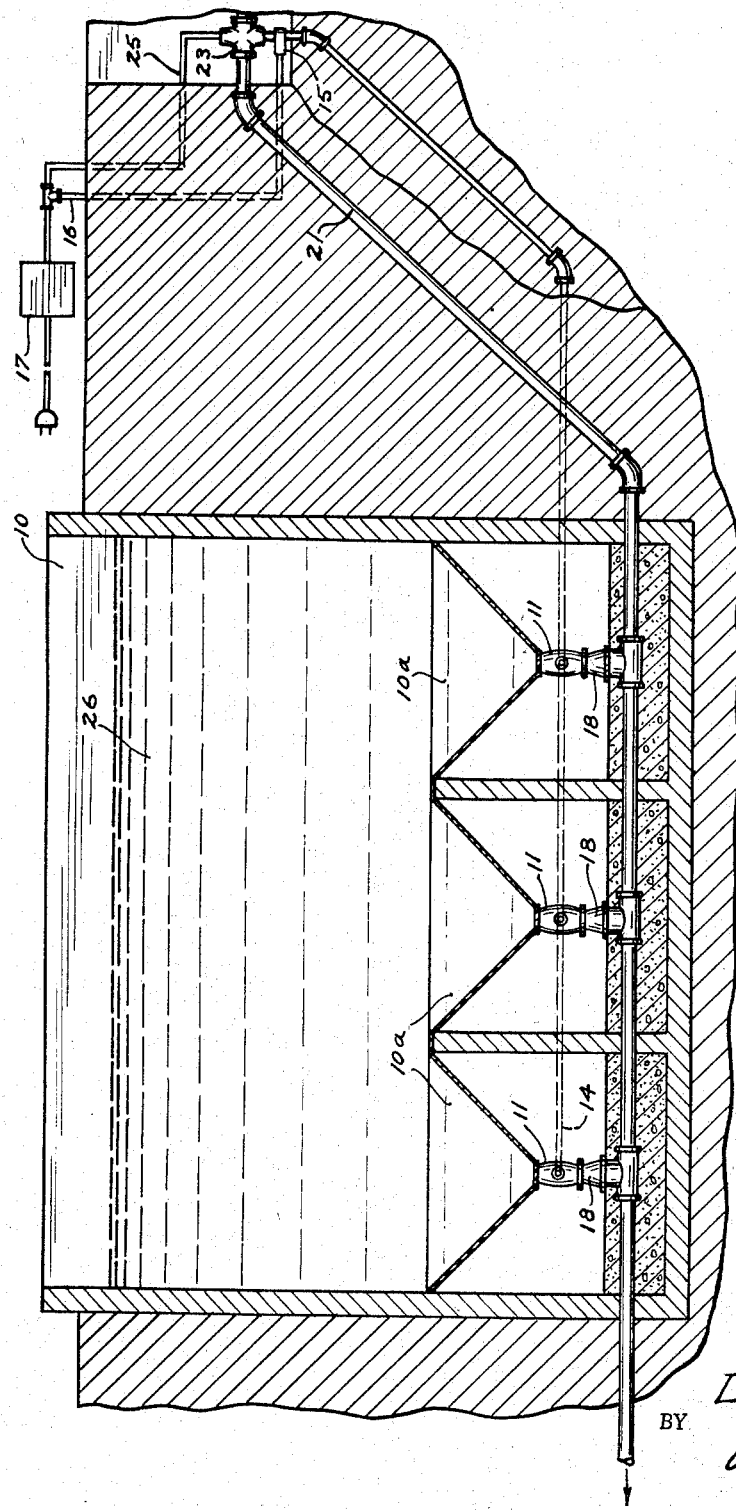
Fig. 1 is a longitudinal central vertical section through an apparatus of this invention.

Fig. 3 is a partial sectional view taken on line 3—3 of Fig. 2, as indicated by the arrows; and Fig. 4 is a transverse section taken on line 4—4 of Fig. 3, as indicated by the arrows, Figs. 3 and 4 being shown on an enlarged scale.

Referring to the drawings, the device comprises a tank 10, and while this might be of various forms, in the embodiment of the invention it is shown as rectangular in plan. Tank 10 is constructed to contain liquid and the same has at its lower portion a plurality of compartments 10a. The walls of said compartments 10a converge downwardly to a central portion thereof and a valve 11 is disposed beneath the central bottom portion of compartments 10a. While various forms of valves could be used, the form shown in the illustrated embodiment of the invention comprises a casing 11a having top and bottom plate-like portions 11b between which extends a resilient and collapsible tube 11c. Casing 11a has a projecting nipple 11d adapted to have connected thereto a conduit 12. The conduits 12 will be connected to a common conduit 14 which will be arranged to be connected to a source of fluid under pressure, such as a pump or pressure tank not shown. A valve 15 is connected to conduit 14, and while it might be possible to use different kinds of valves, an electromagnetically controlled valve is preferred. The magnetically controlled valve 15 will have electric conductors 16 connected thereto, said conductors extending to a timing device 17 which will have an electric cord 13 supplied with a plug 19, which plug can be connected to a regular electrical outlet. Timer 17 will close and open a circuit through conductors 16 and 25.

Below each of the valves 11 is a receptacle 18, and while various forms of receptacles could be used, in the embodiment of the invention illustrated the same are shown as frusto conical in shape. Each of the receptacles 18 is connected to a T connection 20. A conduit 21 is connected to each of the members 20 and this conduit will be connected to a source of fluid under pressure. Conduit 21 will be provided with an electro-magnetically operated valve 23. Valve 23 will have electrical conductors 25 extending therefrom which will be connected to timer 17.

In operation, liquid 26 will be supplied to tank 10. While liquids from various sources may be used, one specific liquid used has been that derived from sewage. As stated, the liquid 26 contains grit, such as sand or other fairly heavy granular material. The liquid is permitted to stand for a certain period and the said grit therein settles into the compartments 10a and passes down through the valves 11 into the receptacles 18 and into the T members 20. The timer 17 which will preferably be electrically operated will at certain desired intervals close a circuit and electrical current will be supplied to conductors 16 as well as to conductors 25. The current in conductors 16 will actuate to open the valve 15 and fluid under pressure, which may be either air or liquid, will be delivered to the valves 11. The tubes 11c of said valves will be collapsed by the fluid under pressure thereabout and this will close valves 11. Timer 17 will close a circuit in conductors 25 and valve 23 will be opened, and fluid under pressure will be delivered to conduit 21. This fluid will pass through all of the T members 20 and the sediment therein and that in receptacles 18 will be flushed out and delivered to a suitable or desired place. After a sufficient period, timer 17 will open the circuit in conductors 16 and 25 and valves 15 and valve 23 will be again closed.

It will thus be seen that the grit contained in the liquid is thus separated and disposed of without being manually handled. The entire operation is automatic and at the desired intervals the sediment is quickly and easily flushed out of members 18 and 20 and delivered to the desired point.

It will thus be seen that I have provided a very novel and efficient means for automatically separating grit, sand, etc. from liquid, The device has been amply tested in actual practice and found to be very successful and efficient and the same is being commercially installed.

It will of course be understood that various changes may be made in the form, details, arrangement and proportions of the device and in the steps and sequence of steps of the method without departing from the scope of applicant's invention, which, generally stated, consists in a method and device capable of carrying out the objects above set forth, such as disclosed and defined in the appended claim.

What is claimed is:

A device having in combination, a tank for containing liquid having particles therein, a plurality of compartments at the bottom of said tank, a receptacle for each of said compartments for receiving said particles, valves for direct communication between each of said compartments and their respective receptacles, a source of fluid under pressure, means for communication in parallel of said fluid with each of said valves, said valves being responsive to said fluid for closing, a conduit connecting each of said receptacles in series and discharging to the atmosphere, a second source of fluid under pressure, means for communication of said last mentioned fluid with said conduit, an electric timing member, an electrically actuated valve connected to said timing member and adapted to be actuated automatically at certain predetermined intervals to actuate both said communication means for providing communication between said valves and said conduit with their respective sources of fluid under pressure for closing said valves and for clearing said particles out of said conduit, and for cutting off said communication with both of said sources of fluid under pressure, and said valves, with said fluid under pressure thereto being cut off, being responsive to said liquid in said tank for opening.

References Cited in the file of this patent

UNITED STATES PATENTS

| | | |
|---|---|---|
| 845,520 | Callow | Feb. 26, 1907 |
| 1,077,476 | Kaibel | Nov. 4, 1913 |
| 1,079,391 | Bunzel | Nov. 25, 1913 |
| 2,464,264 | Schneible | Mar. 15, 1949 |
| 2,586,447 | Way | Feb. 19, 1952 |

FOREIGN PATENTS

| | | |
|---|---|---|
| 427,056 | France | July 26, 1911 |
| 1,053,618 | France | Sept. 30, 1953 |
| 117,576 | Great Britain | July 25, 1918 |
| 138,655 | Great Britain | Feb. 19, 1920 |